Figure 3:
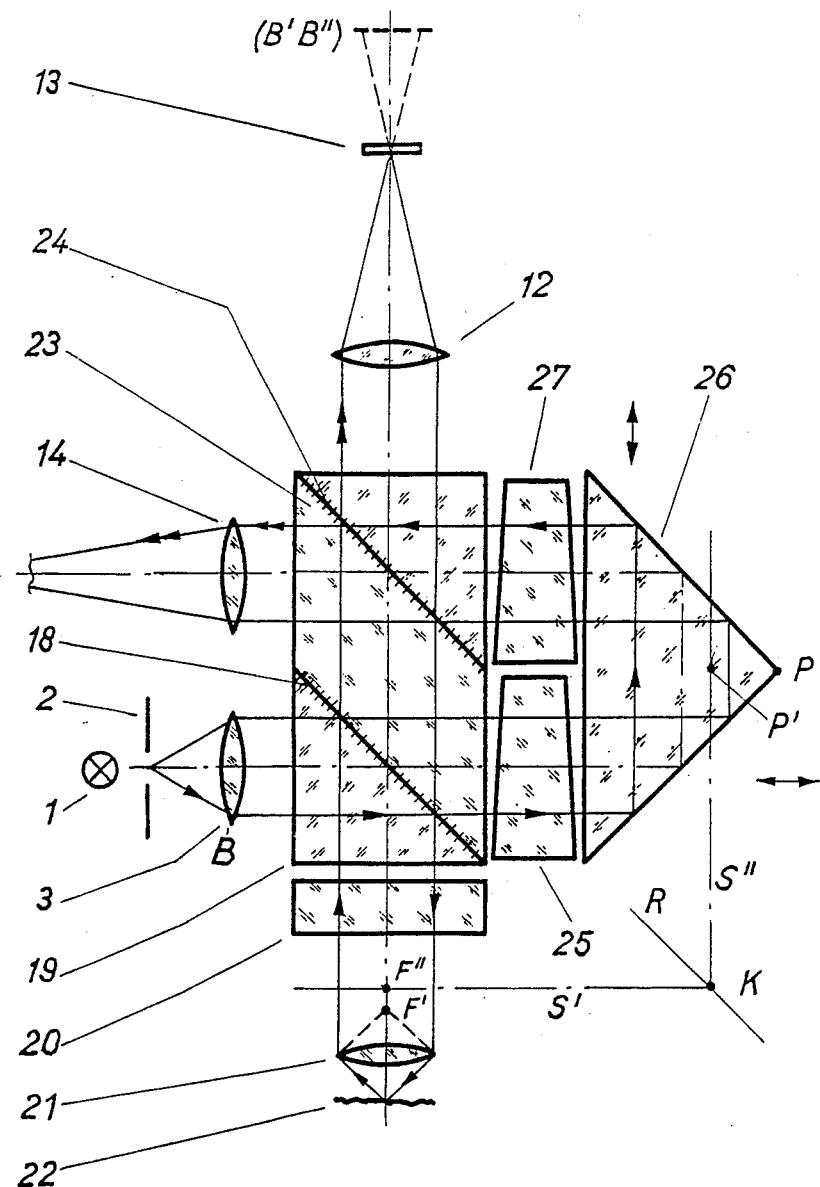

United States Patent [19]

Körner et al.

[11] Patent Number: 4,983,042

[45] Date of Patent: Jan. 8, 1991

[54] METHOD AND SYSTEM FOR MEASURING THE MICROSTRUCTURE OF SURFACES

[75] Inventors: Klaus Körner; Holger Fritz, both of Berlin, German Democratic Rep.

[73] Assignee: Akademie der Wissenschaften der DDR, Berlin, German Democratic Rep.

[21] Appl. No.: 305,448

[22] Filed: Feb. 1, 1989

[30] Foreign Application Priority Data

Feb. 10, 1988 [DD] German Democratic Rep. ... 312815

[51] Int. Cl.$^5$ .............................................. G01B 9/02
[52] U.S. Cl. .................................................... 356/359
[58] Field of Search .......................................... 356/359

[56] References Cited
U.S. PATENT DOCUMENTS
4,714,348 12/1987 MaKosch ...................... 356/359 X Primary Examiner—Davis L. Willis
Assistant Examiner—Matthew W. Koren
Attorney, Agent, or Firm—Schweitzer, Cornman & Gross

[57] ABSTRACT

The invention relates to a method and a system for measuring the microstructure of technical surfaces on the principle of the interference microscope. In accordance with the invention, the virtual planes of reflection present in the object beam space and reference beam space are imaged in an optically conjugated manner by different offsets, while the point at which the beam is split and the point where it is recombined are separated in space and a correction is performed such that the object beam and reference beam propagate parallel to one another in a common beam space. In this manner it is possible, in interferometric measurement, to eliminate undesired circular interference structures and render unnecessary any physical reference surface.

18 Claims, 2 Drawing Sheets

Fig.2

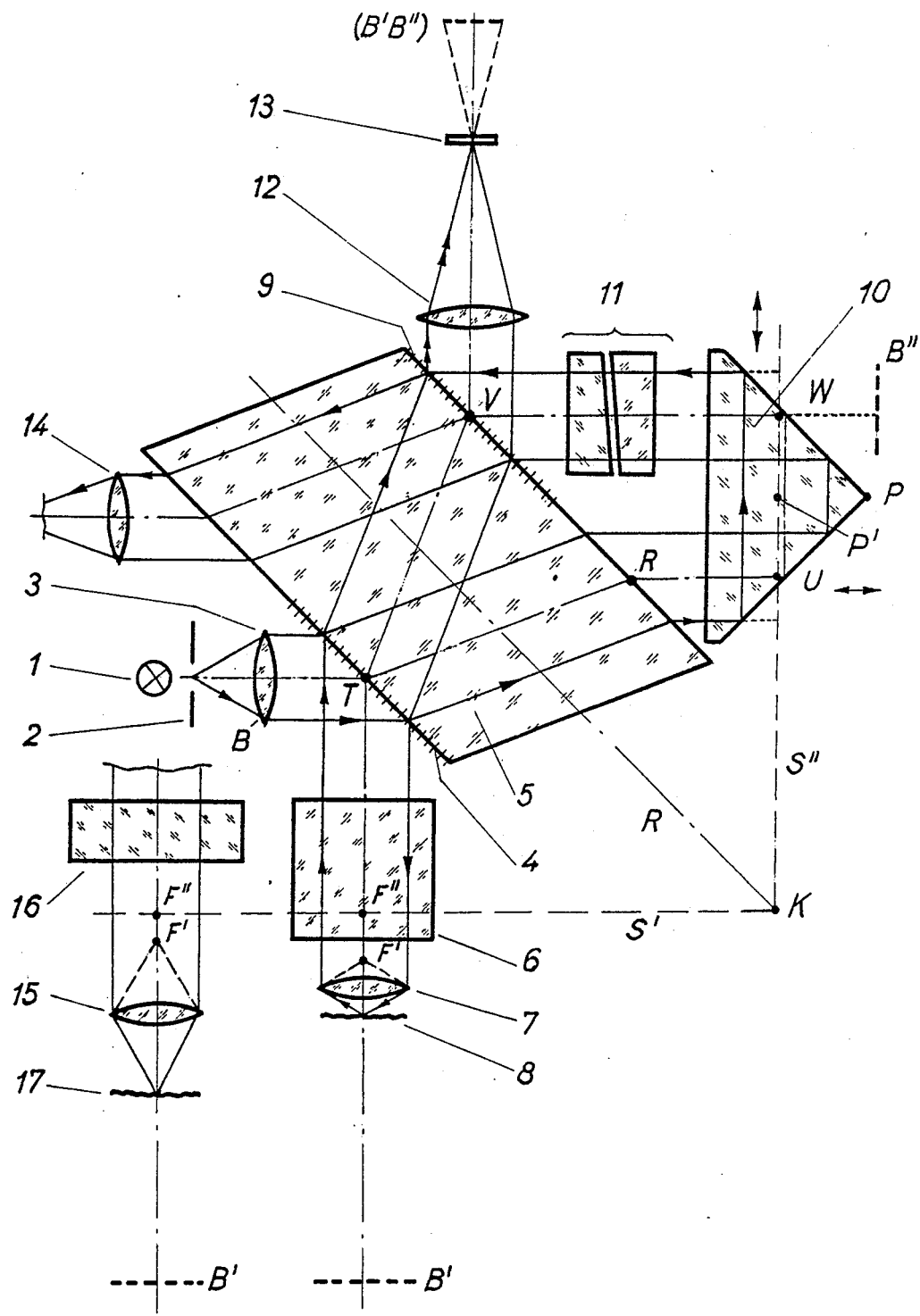

METHOD AND SYSTEM FOR MEASURING THE MICROSTRUCTURE OF SURFACES

FIELD OF APPLICATION OF THE INVENTION

The invention relates to a method and a system for measuring the microstructure of technical surfaces, based on the principle of the interference microscope.

THE STATE OF THE ART

U.S. Pat. No. 4,639,139 discloses the arrangement of a reference mirror in a Mireau interferometer for measuring the surface profile. In this arrangement the reference beam reflected by this reference mirror is influenced by the physically caused residual roughness of the reference mirror, since the reference mirror surface as well as the test surface lies in the plane of focus of the microscope objective, i.e., is sharply imaged. Accordingly, this roughness of the reference surface falsifies the measurement, although a great deal of difficulty is involved in producing a reference mirror of low residual roughness. Furthermore, the Mireau interferometer can be made only with great difficulty when large-aperture objectives ($N>0.5$) are used, yet this is very important for measuring the microstructure of surfaces on account of the high lateral resolution that is required.

In the company literature of WYKO Corp./USA 1/86-5M, Michelson, Mireau and Linnik interferometers are used in measuring the microstructure of technical surfaces. All these interferometers have it in common that the reference surface works out to a residual roughness of 0.4 to 0.8 nm RMS (standard model) and 0.15 nm RMS (special model). Furthermore, it is very important that, for changing the objective magnification between $1.5\times$ and $200\times$, a total of nine interferometer heads be available. This means that not just the objective lens must be changed, as in microscopes in general, but the entire interferometer head must be changed. This means that, in the case of the Linnik interferometer, the interferometer head, consisting of the beam splitter unit, reference lens and test object lens have to be completely replaced. U.S. Pat. No. 4,353,650 describes an optical laser heterodyne profiler for measuring the residual roughness of optical components. For this purpose a focused sample beam and a reference beam are produced, the reference beam remaining stationary on the revolving sample surface and the sample beam covering the profile of the surface point by point on a circular path while the frequency shift between reference beam and sample beam is evaluated electronically.

It is disadvantageous in this case that only the surface profile along a given circular path can be tested. For many purposes the measurement of the surface along a straight line or in a field, however, is of great significance. Furthermore, this method permits only the visual inspection of the foci, but not the observation of the sample surface itself.

According to GDR patent No. 32 879, an interference microscope is known having an imaging objective and an object surface in the object beam space and a triple reflection in the reference beam space. This arrangement permits the use of only one objective having preferably a very high aperture number. However, it is not possible, as shown in the GDR patent, to produce Fizeau stripes by inserting an optical wedge into the one half of the reference beam, since the interferences are observed in the focal plane of a tube objective, i.e., they are at infinity. The insertion of such a wedge into the beam path is here even harmful, because the interference phenomenon vanishes in the plane of observation.

The experimental testing of the use of a triple reflector of glass in the reference beam path of an interference microscope has been described in "Feingerätetechnik" 16(1967)11 pp. 505-508, for a system without a wedge in the reference beam space. In the plane of observation, however, circular interference structures appear, which form independently of the shape of the surface, and thus so greatly limit the usefulness of this optical system that this system has not yet found any practical use in interference microscopy. Furthermore, the accuracy requirements of the triple prism with regard to the right angle relationship of the surfaces to one another are very high, e.g., the parallelism errors of the outgoing and returning beam in an interference microscope may not exceed 10 seconds of an angle for visible light. For these reasons it has been necessary in interferometry to continue to work with a reference objective and a physical reference surface.

AIM OF THE INVENTION

It is the aim of the invention to achieve a great reduction of technical complexity in the measurement by interference microscopy of the roughness of surfaces in the Angstrom range.

SUMMARY OF THE INVENTION

The invention sets for itself the task of eliminating undesired circular interference structures occurring in interferometric measurement, and to render unnecessary the formerly required physical reference surface.

This is accomplished by a method in which a light beam is restricted in its spatial angle, collimated, and split by dividing the amplitude into an object beam and a reference beam, so that an object beam space and a reference beam space are formed, while the object beam is optically displaced in the beam propagation direction and focused onto an object surface, reflected by the latter and then again collimated, the reference beam is reversed in its direction of propagation by a three-fold reflection in the reference beam space and mirrored on its axis of symmetry and at the same time also optically shifted, the object beam and the reference beam are recombined and focused, and thus in the common beam space an image of the object surface forms as an interference pattern, while in accordance with the invention the virtual planes of reflection formed in the object beam space and reference beam space are optically conjugated by a different, optical shift, so that the pupils imaged through the object beam space and reference beam space are imaged as common exit pupils in the common beam space and the optical path difference between the interfering object beams and reference beams is made to approach zero for at least one wavelength. At the same time the place where the beams are combined is advantageously spatially separated so as to be able to correct the direction of propagation of the reference beam. It is furthermore advantageous to change the optical path length in the object beam space or reference beam space to fractions of the light wavelength used, such that the phase in an interference pattern is shifted in fractions of $2\pi$ and measured after or during each change. This correction is performed preferably such that the object beam and reference beam are made parallel to one another in the common beam space.

The system in accordance with the invention includes a light source representing a complete interference microscope illumination, a field stop, an illumination lens, a partial mirror coating, an imaging objective, an object surface in the object beam space, which together with the imaging objective forms a virtual plane of reflection in the object beam space, three reflective planar surfaces in the reference beam space which also produce a virtual plane of reflection in the reference beam space, a tube objective, and an image receiver. The light source is followed in the direction of the light by the field stop, the illumination objective and the partial mirror coating, and the latter is followed, first by the imaging objective and the object surface, secondly the three reflective planar surfaces are opposite the object surface. A plate is disposed in accordance with the invention between the partial mirror layer and the imaging objective, and the partial mirror layer is associated with a second partial mirror coating parallel to the first. A pair of rotating wedges or a rotary wedge and the three reflective planar surfaces are associated on the one hand with the partial mirror coating and with the tube objective on the other, followed by an image receiver connected to a computer, and thirdly the partial mirror coating is opposite a second tube objective with an ocular.

Advantageously, the three reflecting planar surfaces are constructed as triple reflector or as a roof reflector followed by a reflection surface, the triple reflector having a joint P or the geometric intersection between the roof reflector and the reflection surface forming a joint P.

The position and the focal length of the imaging objective is coordinated with the optical thickness of the plate preferably such that the optical shift of the focal point F′ of the imaging objective facing the partial mirror coating to the virtual focal point F″ which defines the virtual mirror plane S′ is such that the latter is optically conjugated with the virtual mirror plane S″ of the reference beam space and the two pupils B′ and B″ imaged through the object beam space and reference beam space form in the common beam space a common exit pupil (B′B″).

At the same time it is advantageous if the two partial mirror coatings are together on one plate, each of them preferably covering only about half of the optically utilized surface area.

If a triple reflector is used, the virtual mirror plane S″ is defined by the position of the virtual corner point P′, the virtual corner point P′ resulting as the image of the corner point P by the image displacement of the triple reflector and of the rotary wedge pair, the glass paths in the triple reflector and in the rotary wedge pair as well as the position of the triple reflector being such that the two virtual mirror planes S′ and S″ intersect on a straight line K with a plane of symmetry R between the two partial mirror coatings.

The triple reflector is preferably disposed for displacement transversely of the optical axis. This provides the possibility for adjusting the width of the interference lines.

It is furthermore advantageous for the triple reflector to be a glass prism in order to prevent changes of the relative position of the three reflecting surfaces. The image receiver consists best of a CCD matrix; the inserted plate is preferably wedge-shaped and disposed for transverse displacement in order to assure a precise coinciding of the two pupils B′ and B″ in the common exit pupil (B′B″). If a triple reflector is used, it is disposed for displaceent in the direction of the beam in order to make the optical path difference zero. The imaging objective is preferably disposed for replacement together with the plate.

EMBODIMENTS

The invention is to be further explained below through examples of its embodiment. The corresponding drawings show the system in accordance with the invention:

FIG. 1 with a plane-parallel plate and a triple reflector,

FIG. 2 as an interchangeable objective with corresponding plate,

FIG. 3 with a roof prism combined with a 40° prism.

As shown in FIG. 1, the beam issuing from a monochromatic light source 1 is restricted by a field stop 2, collimated by an illumination objective 3, and arrives at a partial mirror coating 4 on a plane-parallel plate 5.

Part of the beam enters the object beam space and becomes the object beam which passes through a plate 6 and is focused by an imaging objective 7 on an object surface 8, forming a focus spot. From there it is reflected at the focus spot, again collimated by the imaging objective 7, passes again through the plate 6 and passes through the partial mirror coating 4 through the plane-parallel plate 5 onto a second partial mirror coating 9.

The second part of the beam passes through the partial mirror coating 4 and becomes the reference beam, passes through the plane-parallel plate 5 and, after it has left the latter, is reflected by a triple reflector 10 and, being reflected on its axis of symmetry, passes through a rotary wedge pair 11 and is combined at the partial mirror coating 9 with the object beam to form two interference beams, one of which passes through the tube objective 12 to an image receiver 13, and the second interference beam, after passing through the plane-parallel plate 5, can be observed through a tube lens 14 through an ocular that is not shown.

It has been found that the undesirable interference rings are avoided if the optical thickness of plate 6 and the position of the imaging objective 7 are so coordinated with the optical thickness of the triple reflector 10 and of the rotating wedge pair 11, and with the position of the triple reflector, that the virtual plane of reflection S′ and S″ situated in the object beam space and reference beam space intersect one another in the plane bisecting the plane-parallel plate 5 at a point K with a straight line R and thus, in accordance with FIG. 1, the equation $2\times RF'' = RU + WV$ is satisfied and the images B′ and B″ of the illumination objective 3 thus form a common exit pupil (B′B″).

The focal length and the distance between the chief planes of the imaging objective 7 are selected such that the optical path length, i.e., the time the light takes to run through the object beam and reference beam spaces, from the splitting to the recombination of the beam, is equal for the wavelength of the monochromatic light source 1. The rotating wedge pair 11 serves to compensate production defects of the triple reflector 10 and of the plane-parallel plate 5, so that the object beam and the reference beam, after uniting in the common beam space, propagate in a collinear fashion.

FIG. 2 shows a replacement objective 15 of longer focal length with the corresponding thinner plate 16 and an object surface 17. Here, again, the optical thickness of the plate 16 and the relacement objective 15 are so coordinated with one another, as already described, that the position of the virtual reflection plane S' is preserved and the optical path length remains equal.

In accordance with FIG. 3, after the object beam is reflected at a partial mirror coating 18 into a glass block 19 it is focused, after passing through a plate 20, onto an object surface 22 by an imaging objective 21, so that a focus spot is formed. From there it is reflected at the focus spot, again collimated by the imaging objective 21, and passes through the plate 20, through the partial mirror coating 18, through a parallel piece 23, onto a second partial mirror coating 24. The second part of the beam, the reference beam, passes through the partial mirror coating 18, passes through a rotary wedge 25, is deflected at a roof reflector 26 and reflected at its axis of symmetry, passes through another rotary wedge 27 and strikes the partial mirror coating 23 where it is reunited with the object beam, so that two pairs of interference beams are formed, which are used as in Example 1.

We claim:

1. A process for observing the microstructure of the surface of a test object, comprising, restricting the spatial angle of a monochromatic light beam, collimating said light beam, splitting said collimated light beam in an object beam and a reference beam, optically redirecting the object beam, passing the object beam through a lens for focussing the object beam onto the surface of the test object, reflecting the beam from said surface, collimating the reflected object beam, passing the reference beam through redirecting means for redirecting its path, then passing said reference beam through reflector means for reversing the direction of the path of the reference beam and for redirecting said reference beam in a direction opposite to its direction prior to redirection, further redirecting said reference beam, recombining and focussing in a common beam the object beam and the reference beam, and forming an observable image, the image being an interference pattern of the surface of said object, observing the interference pattern, conjugating by optical redirection the virtual planes of reflections formed by the object beam and the reference beam, and zeroing for at least one wavelength the optical path differences between interfering object beams and reference beams.

2. The process of claim 1, further comprising forming a second, separately observable composite of the object beam and of the reference beam, and wherein said zeroing the path differences comprises adjusting the length of the optical paths of the object beam and of the reference beam, between the splitting of the light beam and the recombination of the object beam and of the reference beam to equal the wavelength of said light source.

3. The process of claim 2, wherein said collimating of the reflected object beam is carried out by said means for focussing the object beam, and wherein said adjusting of the optical paths is carried out by proper dimensioning of said means for focussing the object beam.

4. The process of claim 1, further comprising after passing the reference beam through said reflector means, passing the reference beam through correcting means for compensating for any defects in said reflector means and in said redirecting means, so that said object beam and said reference beam have a substantially identical optical path after they were combined.

5. The process of claim 1, wherein said redirecting means is a planparallel plate having a plurality of reflecting surfaces, said reflector means is a light direction reversing reflector, said lens for focussing the object beam onto the surface of the test object is a lighting objective, said correcting means comprises two rotatable optical wedges disposed adjacent to each other or one wedge each at each end of said light direction reversing reflector, and said observing of the interference pattern is carried out with a computer.

6. The process of claim 1, wherein the location of separation of the incident light onto an object beam and a reference beam, a spatially separate from the location of combination where the object beam and the reference beam a recombined with each other.

7. The process of claim 1, further comprising adjusting the optical path lengths of the object beam and of the reference beam as a function of the wavelength of the monochromatic light beam, whereby the phase of the interference pattern is shifted in fractions of $2\pi$ and is measured during or after each adjusting.

8. Apparatus for measuring the microstructure of surfaces by the process of claim 1, which comprises in the sequence of the path of light, a light source, an aperture, an illuminating leans, a first semitransparent mirror for splitting the light from said light source into an object beam and reference beam, in the path of the object beam an optical plate, an image focussing lens, in the path of the reference beam a light direction reversing reflector, a rotatable optical wedge each disposed before and after said light direction reversing reflector or a pair of rotatable wedges disposed in the path of the reference beam at one end of said reflector, and a second semitransparent mirror disposed substantially parallel to said first semitransparent mirror, said second transparent mirror being adapted to combine said object beam and said reference beam and to reflect one part of the combined beam to an image forming lens, an image receiver, and a computer for evaluating the image from the image receiver, and to transmit another part of said combined object beam and said reflector beam to a place of observation.

9. System in accordance with claim 8, characterized in that the three reflecting planar surfaces are configured as triple reflector (10) or as roof reflector followed by reflection surface, the triple reflector (10) having a corner point P in the first case, or the geometrical intersection between the roof reflector and the reflection surface forming a corner point P in the second case.

10. System in accordance with claim 8, characterized in that the position and focal length of the imaging objective (7;15;21) is so coordinated with the optical thickness of the plate (6;16;20) that the optical displacement of the focal point (F') facing the partial mirror coating (4;18) to the virtual focal point (F'') defining the virtual plane of reflection (8') is such that the latter is optically conjugated with the virtual plane of reflection (S'') of the reference beam space, and thus the two pupils (B';B'') imaged through the object beam space and reference beam space form in the common beam space a common exit pupil (B'B'') or are imaged with a parallel offset in a common plane.

11. System in accordance with claim 10, characterized in that the position of the virtual mirror plane (S'') in the reference beam space is defined by the position of the virtual corner point (P') and the virtual corner point (P') results as an image of the corner point (P) of the triple reflector (10) by the image offset thereof and of the rotary wedge pair (11) in the reference beam space, the glass paths in the triple reflector (10) and in the rotary wedge pair (11) and the position of the triple reflector (10) being dimensioned such that preferably the virtual corner point (P') is optically conjugated in the reference beam space with the virtual focal point (F") in the object beam space, and thus the two virtual mirror planes (8';8") are optically conjugated and intersect with the plane of symmetry (R) between the two partial mirror coatings (4;9) on a straight line (K).

12. System in accordance with claim 8, characterized in that the two partial mirror coatings (4;11) are situated together on a plane-parallel plate (5), each covering preferably only about one-half of the utilized optical surface.

13. System in accordance with claim 8, characterized in that the triple reflector (10) is a glass prism.

14. System in accordance with claim 8, characterized in that the triple reflector (10) is disposed for displacement across the optical axis and the virtual corner point (P') is imaged parallelly offset in a common plane with the virtual focal point (F") in the common beam space, and thus an interference image of high stripe density is formed.

15. System in accordance with claim 8, characterized in that the image receiver (13) consists of a CCD matrix.

16. System in accordance with claim 8, characterized in that the plate (6;16;20) is disposed wedge-wise and transversely displaceably.

17. System in accordance with claim 8, characterized in that the triple reflector (10) is disposed for displacement in the direction of radiation.

18. System in accordance with claim 8, characterized in that the imaging objective (7;15;21) is disposed replaceably together with, the plate (6;16;20).

* * * * *